United States Patent Office 3,335,110
Patented Aug. 8, 1967

3,335,110
PROCESS FOR STABILIZING VULCANIZED
ACRYLIC ELASTOMERS
Guido Mino, Berkeley Heights, and Jack Horstmann
Thelin, Somerville, N.J., assignors to American Cyanamid Company, Stamford, Conn., a corporation of
Maine
No Drawing. Filed Jan. 3, 1964, Ser. No. 335,676
4 Claims. (Cl. 260—45.9)

ABSTRACT OF THE DISCLOSURE

This invention relates to an elastomeric composition having reduced tendency to deteriorate with aging, said composition consisting essentially of a copolymer of an alkyl acrylate and a halogen-containing monomer; and at least one anti-aging agent selected from the group consisting of N-phenyl-beta-naphthylamine, N-phenyl-alpha-naphthalamine, 2,4-diaminodiphenylamine, N,N'-diphenyl - ethylenediamine, N,N' - ditolyl - p - phenylenediamines, N-lower alkylated diphenylamines, and the condensation product of acetone and a member selected from the group consisting of aniline, p-phenetidine, 4-aminobiphenol and diphenylamine.

---

This invention relates to the use of certain amines as anti-aging agents in acrylic elastomers.

Vulcanized acrylic elastomers, such as the elastomeric copolymer of ethyl acrylate and vinyl chloroacetate, deteriorate on aging, especially at elevated temperatures. While, under a given set of conditions, this problem is minimal in comparison with other commercial rubber products, acrylic elastomers are widely used in high temperature environments, and under extreme conditions for prolonged periods, they will eventually deteriorate.

Unlike most elastomeric polymers, acrylic elastomers are saturated polymers. Oxygen is known to attack unsaturated elastomers at the points of unsaturation, resulting in deterioration. Conventional antioxidants for unsaturated elastomers protect these points from oxidative attack. Known rubber antioxidants, such as the "phenolics," would thus be expectedly ineffective as antioxidants in acrylic elastomers because of the absence of vulnerable unsaturations. As a matter of fact, "phenolic" antioxidants do improve the oxygen resistance of acrylic elastomers, but only to a limited extent and not for prolonged periods of high temperature exposure. For this relatively new class of elastomers, there is not yet available, an antioxidant which is capable of providing protection for prolonged periods of high temperature exposure.

It is an object of this invention to provide a method by which acrylic elastomers can be made highly resistant to oxidative attack even at high temperatures. It is a further object of this invention to provide an acrylic elastomeric copolymer which is highly resistant to oxidative attack.

These and other objects have been accomplished in accordance with this invention by the use of at least one anti-aging agent such as (1) ketone-amine condensation products, such as acetone-aniline, acetone-p-phenetidine, acetone-4-aminobiphenyl or acetone-diphenylamine and (2) diarylamines such as N-phenyl-beta-naphthylamine, N - phenyl - alpha - naphthylamine, 2,4 - diaminodiphenylamine, N,N'-di-phenyl-ethylenediamine, N,N'-ditolyl-p-phenylenediamines and N - lower alkylated diphenylamines. These compounds are known and can be prepared by methods known in the art. Specifically the condensation products are preparable by the methods shown in U.S. Patents 1,915,108 and 2,562,802.

The anti-aging agents are used in amounts of between 0.1% and 5%, preferably between 1% and 5%, based on the weight of the elastomer. The agent is incorporated into the elastomer by standard compounding techniques, as on a rubber mill. Other compounding ingredients and additives may also be incorporated at the same time.

The elastomeric compositions are cured and postcured, if desired, by standard procedures.

The vulcanizates may be tested for resistance to deterioration by aging according to standard test procedures, including accelerated aging tests. The physical properties of the vulcanizates are measured before and after aging. The vulcanized elastomers containing "amine" anti-aging agents of this invention, show very much better resistance to aging than the vulcanizates containing no amines. They are also better than those containing phenolic types of antioxidants.

The elastomers which are preserved by the present invention are based on copolymers of alkyl acrylates and a minor proportion of a monomer containing an active halogen such as vinyl chloroacetate. These copolymers can be vulcanized with the commercially available curing agents previously used in curing known acrylic elastomers.

As to the alkyl acrylates employed, the alkyl group may be straight- or branched-chain. One acrylate ester may be used alone, or several in combination. Typical members are methyl, ethyl, propyl, butyl, hexyl and octyl acrylates.

The most preferred active halogen containing monomers, comprise vinyl chloroacetate, 2-chloroethyl acrylate and 2-chloroethyl vinyl ether, and the like.

In the product copolymer there should be at least seventy weight percent of the alkyl acrylate moiety. The moiety of the halogen-containing monomer should comprise from about two to about eight weight percent of the whole, but this may be reduced to as little as about 0.5% or increased to about 15%. Also, if so desired, the product copolymer may contain one or more additional copolymerized compatible comonomers, such, for example, as acrylonitrile. When used, such extraneous comonomers may comprise as much as about fifteen percent of the composition.

The acrylic elastomers are fully disclosed in commonly assigned, copending application, Ser. No. 203,463, filed June 19, 1962, by Samuel Kaizerman and now Patent No. 3,201,373.

This invention is illustrated in the following examples.

EXAMPLE 1

Three master-batches are prepared, each containing 100 parts of a 97.5/2.5 ethyl acrylate/vinyl chloroacetate elastomer, 50 parts of semi-reinforcing furnace black and 2 parts of stearic acid. Each master-batch is milled for about 10 minutes on a rubber mill at 50 to 80° C. with 3 parts of ammonium benzoate and, where used, 2 parts of an antioxidant.

Vulcanizate A—no antioxidant.
Vulcanizate B—phenyl-beta-naphthylamine.
Vulcanizate C—2,2'-methylenebis(4-methyl-6-tert. butylphenol).

The elastomer mixes are cured in molds under pressure at 165° C. for 10 minutes and then postcured for 24 hours at 150° C. Aging tests are then made on the vulcanizates at 176° C. (350° F.) for 70 hours and 168 hours, according to ASTM methods. The unaged and aged vulcanizates have the stress-strain properties shown in Table I.

TABLE I

|  | Vulcanizate A, Aged (Hours) | | | Vulcanizate B, Aged (Hours) | | | Vulcanizate C, Aged (Hours) | | |
| --- | --- | --- | --- | --- | --- | --- | --- | --- | --- |
|  | 0 | 70 | 168 | 0 | 70 | 168 | 0 | 70 | 168 |
| Modulus: | | | | | | | | | |
| 100%, p.s.i. | 300 | (1) | (1) | 225 | 400 | 275 | 225 | 350 | 90 |
| 200%, p.s.i. | 1,375 | (1) | (1) | 1,300 | 1,450 | 975 | 1,200 | (1) | (1) |
| Tensile Strength, p.s.i. | 1,775 | 275 | (1) | 1,575 | 1,825 | 1,250 | 1,825 | 825 | (1) |
| Percent Elongation | 250 | 90 | (1) | 250 | 270 | 250 | 280 | 170 | (1) |

[1] Values not obtained because of deterioration of the elastomer.

From Table I it can be seen that the antioxidant of this invention imparts remarkable stability to chlorine containing polymers, even as compared to other known antioxidants which are only semi-effective.

EXAMPLE 2

Four master-batches are prepared, milled and cured as described in Example 1. Where used, only 1.5 parts of anti-aging agent is employed. The vulcanizates have the properties shown in Table II.

Vulcanizate A—no anti-aging agent.
Vulcanizate B—phenyl-beta-naphthylamine.
Vulcanizate C—mixed N,N'-ditolyl-p-phenylene-diamines.
Vulcanizate D—mixture of N,N'-diphenyl-p-phenylenediamine and diphenylamine-acetone condensate.

TABLE II

|  | Vulcanizate A, Aged (Hours) | | | Vulcanizate B, Aged (Hours) | | | Vulcanizate C, Aged (Hours) | | | Vulcanizate D, Aged (Hours) | | |
| --- | --- | --- | --- | --- | --- | --- | --- | --- | --- | --- | --- | --- |
|  | 0 | 70 | 168 | 0 | 70 | 168 | 0 | 70 | 168 | 0 | 70 | 168 |
| Modulus: | | | | | | | | | | | | |
| 100%, p.s.i. | 375 | 225 | (1) | 350 | 350 | 250 | 325 | 425 | 500 | 350 | 475 | 400 |
| 200%, p.s.i. | 1,375 | 600 | (1) | 1,300 | 1,175 | 725 | 1,175 | 1,325 | 1,250 | 1,350 | 1,425 | 1,100 |
| Tensile Strength, p.s.i. | 1,850 | 750 | 425 | 1,775 | 1,575 | 1,000 | 1,700 | 1,475 | 1,325 | 1,825 | 1,650 | 1,275 |
| Percent Elongation | 270 | 250 | 50 | 270 | 280 | 290 | 270 | 220 | 210 | 260 | 230 | 220 |

[1] Values not obtained because of deterioration of the elastomer.

EXAMPLE 3

Three master-batches are prepared, each containing 100 parts of a 97.5/2.5 ethyl acrylate/vinyl chloroacetate elastomer, 50 parts of carbon black and 2 parts of stearic acid. Each master-batch is milled for about 10 minutes on a rubber mill at 50° to 80° C. with 4 parts of ammonium benzoate, 2.5 parts of dodecyl bromide, 0.1 part of magnesium oxide and the amount of acetone-diphenylamine condensation product shown below.

The elastomer mixes are cured in molds, under pressure for 10 minutes at 165° C. and then postcured for 24 hours at 150° C. Aging tests are made at 176° C. The tensile strength and elongation are measured before and after aging, and the percent change then calculated. The results are shown in Table III.

Vulcanizate A—no acetone diphenyl amine condensate.
Vulcanizate B—2 parts of acetone diphenyl amine condensate.
Vulcanizate C—3 parts of acetone diphenyl amine condensate.

TABLE III

|  | Vulcanizate A, Aged (Hours) | | Vulcanizate B, Aged (Hours) | | Vulcanizate C, Aged (Hours) | |
| --- | --- | --- | --- | --- | --- | --- |
|  | 70 | 168 | 70 | 168 | 70 | 168 |
| Percent Change in Tensile Strength | −48 | −60 | −16 | −29 | −8 | −26 |
| Percent Change in Elongation | −21 | −53 | −5 | −5 | +6 | 0 |

Similar results are offered when the copolymers of other alkyl acrylates with halogen containing monomers as described above, are treated with anti-aging agents of the invention. The treated copolymers have improved stability compared with either control sample or samples in which phenolic anti-aging agents are used.

We claim:

1. An elastomeric composition having reduced tendency to deteriorate with aging consisting essentially of:
   (a) a copolymer of an alkyl acrylate in which the alkyl group has 1–8 carbons with a halogen containing monomer selected from the group consisting of vinyl chloroacetate, 2-chloroethyl acrylate and 2-chloroethyl vinyl ether, at least seventy weight percent of said copolymer being constituted of the alkyl acrylate moiety; and
   (b) at least one anti-aging agent selected from the group consisting of N-phenyl-beta-naphthylamine, N-phenyl-alphanaphthylamine, 2,4-diaminodiphenylamine, N,N'-diphenyl-ethylenediamine, N,N'-ditolyl-p-phenylenediamines, N-lower alkylated diphenylamines, and the condensation product of acetone and a member selected from the group consisting of aniline, p-phenetidine, 4-aminobiphenyl and diphenylamine the anti-aging agent concentration being about 0.1 to 5% weight percent of the composition.

2. The composition of claim 1 wherein the anti-aging agent is phenyl-beta-naphthylamine.

3. The composition of claim 1 wherein the anti-aging agent is mixed N,N'-ditolyl-p-phenylenediamines.

4. The composition of claim 1 wherein the anti-aging agent is a mixture of N,N'-diphenyl-p-phenylenediamine and diphenylamine-acetone condensate.

References Cited

UNITED STATES PATENTS

| | | | |
|---|---|---|---|
| 3,157,619 | 11/1964 | Bell et al. | 260—45.9 |
| 3,163,616 | 12/1964 | Stahly | 260—45.9 |
| 3,201,373 | 8/1965 | Kaiserman | 260—79.5 |
| 3,225,000 | 12/1965 | Welch | 260—45.9 |
| 3,277,174 | 10/1966 | Wheeler | 260—45.9 |

DONALD E. CZAJA, *Primary Examiner.*

H. E. TAYLOR, *Assistant Examiner.*